(12) United States Patent
Itokawa

(10) Patent No.: US 6,721,360 B2
(45) Date of Patent: Apr. 13, 2004

(54) IMAGE PROCESSING APPARATUS AND METHOD

(75) Inventor: Osamu Itokawa, Akishima (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/413,770

(22) Filed: Sep. 28, 1999

(65) Prior Publication Data

US 2003/0031253 A1 Feb. 13, 2003

(30) Foreign Application Priority Data

Oct. 9, 1998 (JP) .......................... 10-287773
Sep. 28, 1999 (JP) .......................... 11-274711

(51) Int. Cl.[7] ................................ H04N 7/12
(52) U.S. Cl. ................ 375/240.11; 348/699
(58) Field of Search .............. 348/699; 375/240.01, 375/240.11; 382/240

(56) References Cited

U.S. PATENT DOCUMENTS 5,768,438 A * 6/1998 Etoh .......................... 382/251
5,844,630 A * 12/1998 Yamauchi .................... 348/699
5,963,257 A * 10/1999 Katata et al. ................ 348/398
6,128,344 A * 10/2000 Aono et al. ............. 375/240.11

OTHER PUBLICATIONS

U.S. patent application Ser. No. 09/452,818 filed Dec. 1, 1999.

* cited by examiner

Primary Examiner—Chris Kelley
Assistant Examiner—George A Bugg
(74) Attorney, Agent, or Firm—Fitzpatrick, Cella, Harper & Scinto

(57) ABSTRACT

An image processing apparatus and method wherein image data is input and separated into foreground object data and background object data, image data in a missing portion of the background object data formed by a separation of the foreground object data is interpolated by using image data around the missing portion.

21 Claims, 15 Drawing Sheets

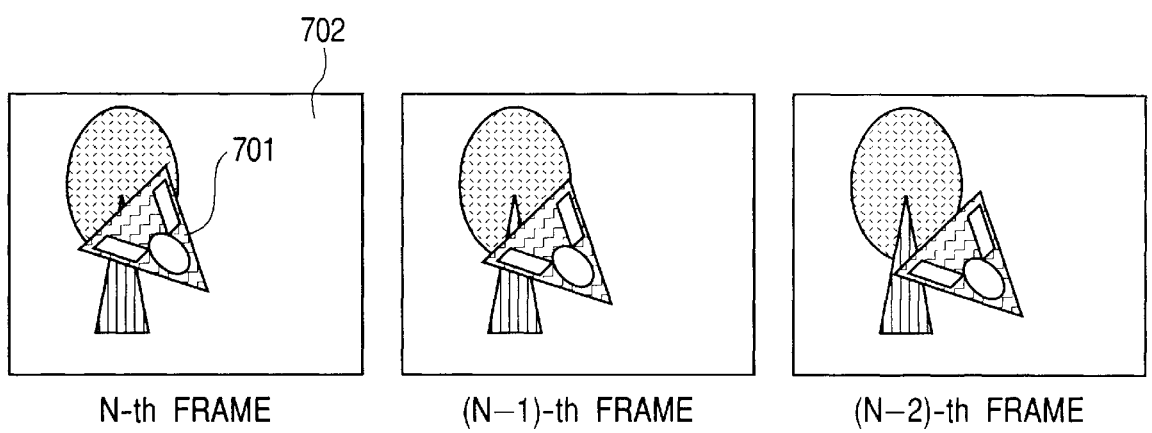
FIG. 7A  N-th FRAME
FIG. 7B  (N−1)-th FRAME
FIG. 7C  (N−2)-th FRAME
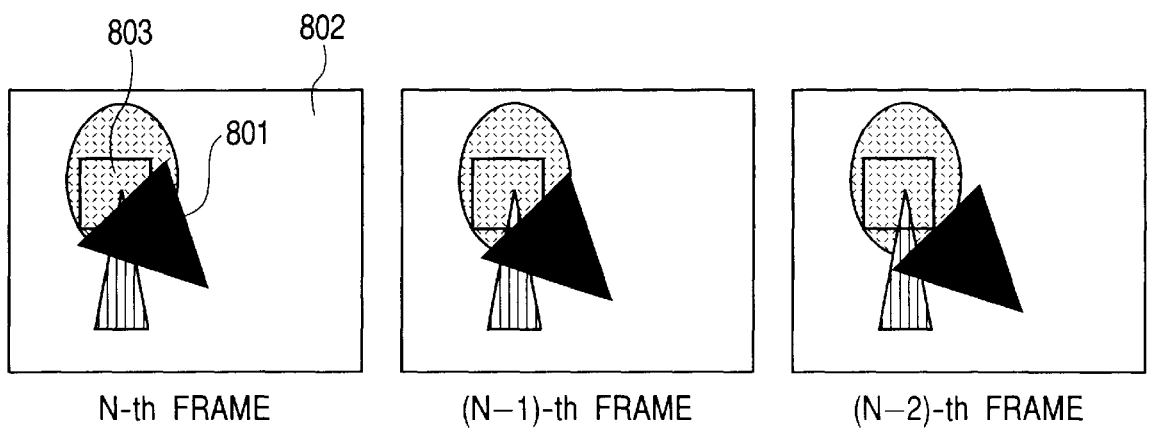
FIG. 8A  N-th FRAME
FIG. 8B  (N−1)-th FRAME
FIG. 8C  (N−2)-th FRAME

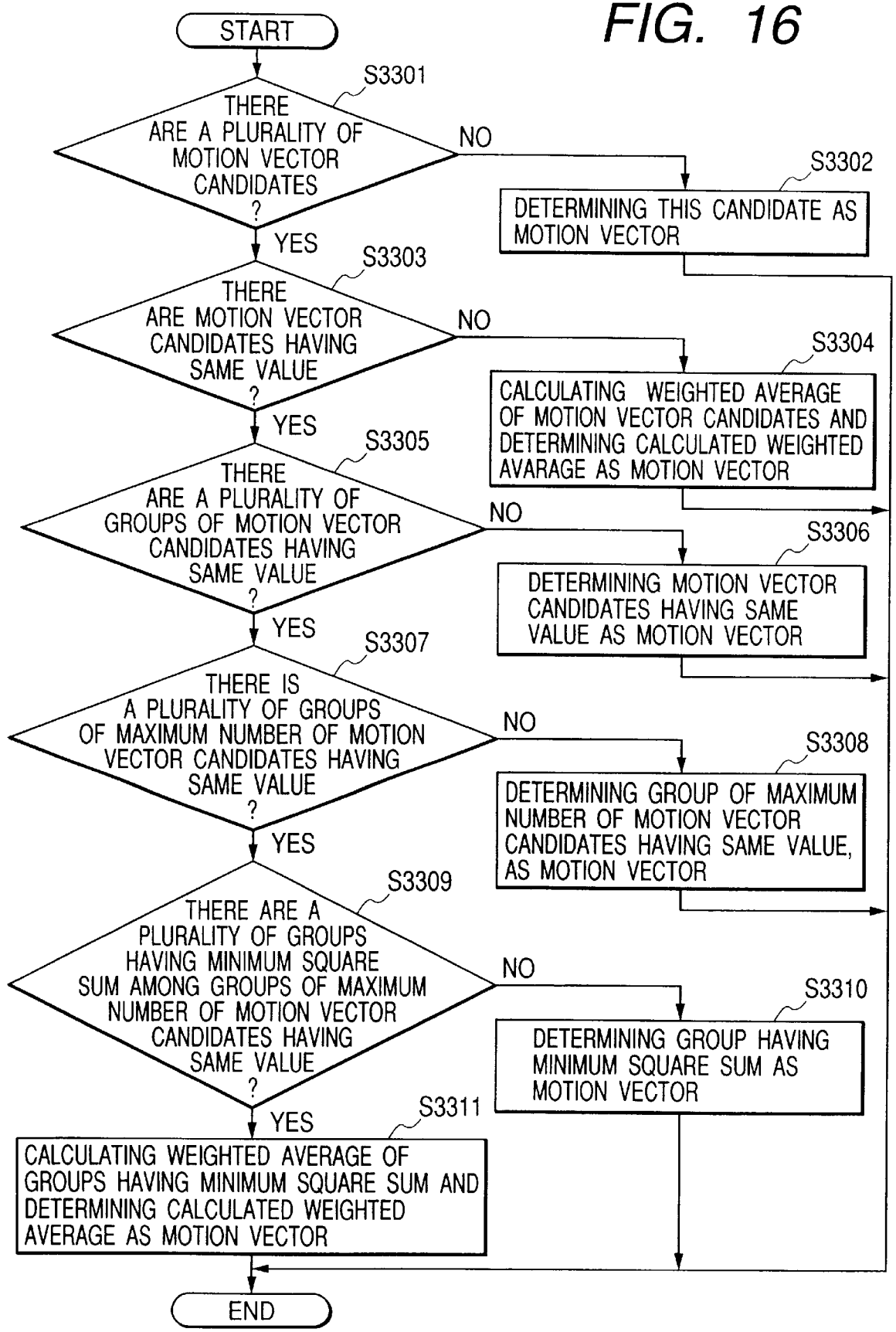

IMAGE PROCESSING APPARATUS AND METHOD

BACKGROUND OF THE INVENTION

1. Field of the Invention

The present invention relates to an image processing apparatus and method for processing an image by object separation.

2. Related Background Art

Needs for editing a moving image on a personal computer are becoming high with the wide use of personal computers having a high performance CPU.

Various editing works are known including a time sequence exchange between frames or fields, wipe, dissolve, mosaic, insertion of another image, and the like.

Instead of processing an image on the frame or field unit basis, an image is divided into a significant unit (hereinafter called an object) such as an individual subject, a background and a character and each object is processed independently. This technique is also being developed. In order to process each object independently, it is necessary to derive an object from a frame or field image. There is a conventional method of deriving an object from a moving image, called blue back. With this method, a blue background is prepared in a studio set, and a blue portion is replaced by another background image by using a switcher. Another method separates an object by deriving an edge portion from an image.

Such a method as blue back, however, is associated with the disadvantage that another background image is required to be prepared in advance. Even if a background object and a foreground object can be separated by using another method, the background object has a hole (area) having no data where the foreground object existed, and the background object is difficult to be used again.

For example, consider a case wherein an original foreground object of some scene is to be replaced by another object. In this case, it is necessary that after the foreground object is derived from the original image, another foreground object is required to be synthesized with the remaining background object. There is no problem if the hole formed after the original foreground object is derived can be filled with another foreground object to be synthesized. However, this considerably limits the versatility of reuse or re-processing of the object.

SUMMARY OF THE INVENTION

In view of the above-described circumstances, an object of the present invention is to provide a background object having a high versatility by interpolating a data missing portion such as a hole formed in a background object after the foreground object was derived.

In order to achieve the above object of the invention, according to aspect of the present invention, there is provided an image processing apparatus/method wherein image data is input and separated into foreground object data and background object data, and image data in a missing portion of the background object data formed by a separation of the foreground object data is interpolated by using image data around the missing portion.

According to another aspect of the present invention, there is provided an image processing apparatus/method wherein image data is input and separated into foreground object data and background object data, a missing portion of the background object data formed by a separation of the foreground object data is interpolated, the interpolated background object data is encoded, and the foreground object data is encoded.

Other objects, features and advantages of the invention will become apparent from the following detailed description taken in conjunction with the accompanying drawings.

BRIEF DESCRIPTION OF THE DRAWINGS

FIGS. 7A, 7B and 7C show examples of an original image.

FIGS. 8A, 8B and 8C show examples of a background image after the foreground image was derived.

FIG. 16 is a flow chart illustrating an algorithm for determining a motion vector for a target block.

DETAILED DESCRIPTION OF THE PREFERRED EMBODIMENTS

In embodiments of the invention, one image (frame or field image) having a data missing portion is used as a target and divided into blocks each constituted of a predetermined number of pixels. It is checked whether each divided block contains a data missing portion. The block containing a data missing portion is used as a target block and its nearby blocks are used as surrounding blocks.

A motion vector in a surrounding block is searched from the preceding or succeeding sample frame or field. In accordance with the obtained motion vectors of the surrounding blocks, a motion vector for the target block is obtained. Interpolation is performed by checking the validity of the motion vector data and target block data. If the data cannot be filled completely in the data missing portion in the target block, the sample frame or field is changed to thereafter continue the above operations.

With these operations, it is possible to easily and reliably generate a perfect background object from the background object with a data missing portion.

The embodiments of the invention will be described with reference to the accompanying drawings.

Figure 1A:
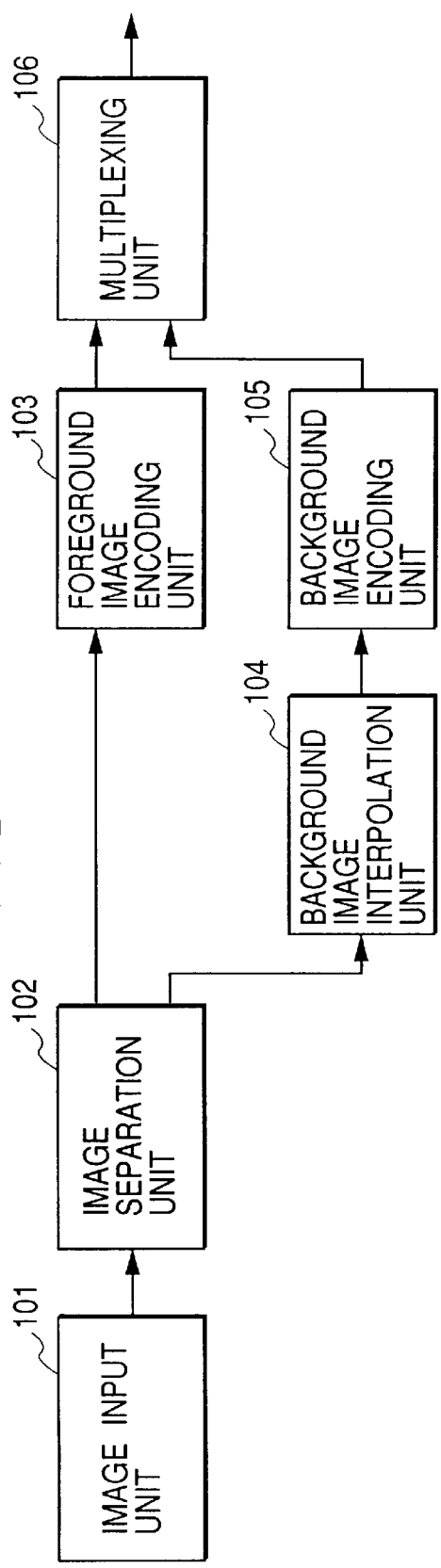
FIGS. 1A and 1B are block diagrams showing the overall structure of an image processing apparatus according to an embodiment of the invention.
Figure 1B:
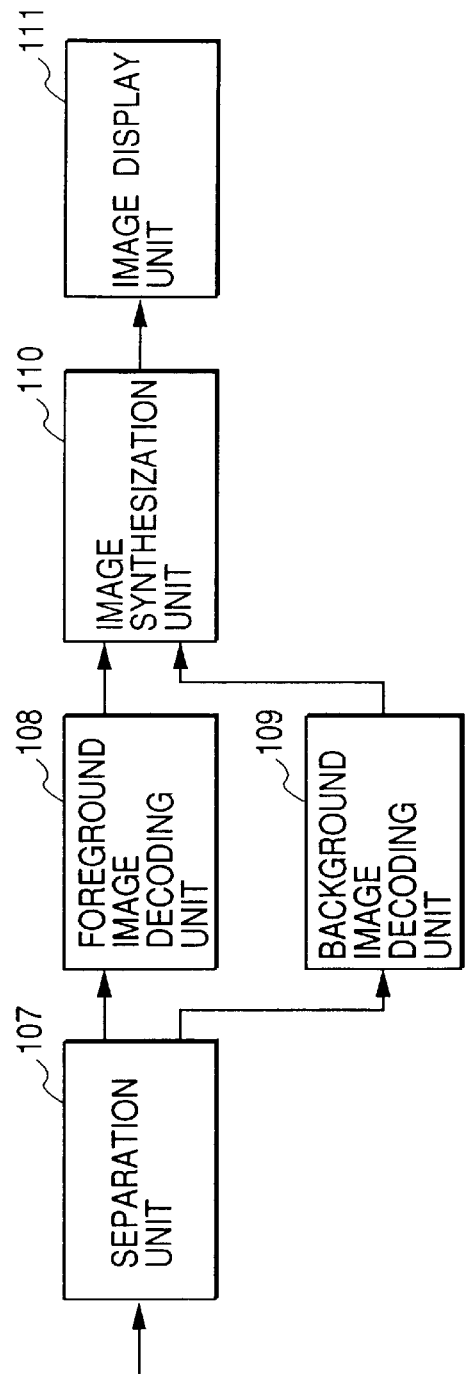

FIGS. 1A and 1B are block diagrams showing the structure of an image processing apparatus according to the first embodiment of the invention.

FIG. 1A shows an encoding side, and FIG. 1B shows a decoding side.

An image input unit 101 is supplied with an image signal from a video camera, a VTR or the like. If the image signal is an analog signal, it is converted by the image input unit 101 into a digital signal. If the input image signal is a color signal, it is separated into a luminance signal and two color difference signals and then converted into digital signals.

An image separation unit 102 separates an image into a background object and a foreground object. If each object has different vectors between frames, the background object and foreground object can be separated in accordance with these different vectors. It is also effective to judge a difference between objects by using color information. The separated background object is encoded by a foreground image encoding unit 103. The background object is supplied to the background image interpolation unit 104 which performs a process characteristic to the present invention in order to embed data in a data missing portion. The detailed process will be later described with reference to a flow chart shown in FIG. 6.

The interpolated background object is encoded by the background image encoding unit 105. Although this encoding process may use the same encoding process to be executed by the foreground image encoding unit 103, a different encoding process capable of incorporating the feature of a background image is used so that high efficiency encoding becomes possible.

After the foreground and background objects are subjected to optimum encoding processes, the objects are changed to a bit stream by a multiplexing unit 106 which processes the bit stream so as to match the characteristics of a transmission path, and thereafter the bit stream is transmitted or recorded.

On the decoding side shown in FIG. 1B, the operations opposite to those on the encoding side are performed.

First, a separation unit 107 separates the bit stream into objects which are the units to be processed. In this example, the objects are the foreground object and background object. A foreground image decoding unit 108 performs a decoding process corresponding to the foreground image encoding unit 103, and a background image decoding unit 109 performs a decoding process corresponding to the background image encoding unit 105.

An image synthesization unit 110 synthesizes objects to obtain one frame or field image. An image display unit 111 converts the synthesized image data into image data matching the format of an image display device and displays it.

Next, the detailed algorithms characteristic to the invention to be executed by the background image interpolation unit 104 will be detailed with reference to FIGS. 2 to 6. Images shown in FIGS. 7A to 7C through 14A to 14E are used in the following description by way of example.

FIGS. 7A to 7C show examples of an original image. For the simplification, images moving on the frame unit basis are illustratively used.

FIG. 7A shows an image of an N-th frame. Reference numeral 701 represents a foreground object and reference numeral 702 represents a background object. FIG. 7B shows an image of an (N−1)-th frame. The position of the foreground object 701 is different from that shown in FIG. 7A. Similarly, FIG. 7C shows an image of an (N−2)-th frame. The position of the foreground object 701 moves further.

By deriving the foreground image by utilizing a difference of a motion between frames, the background images 802 become as shown in FIGS. 8A to 8C. A portion 801 where the foreground image existed has no data. Therefore, data having a zero luminance level is inserted temporarily.

In the following description, a frame to be interpolated is called a target frame, and a frame from which candidate interpolation data is searched is called a sample frame.

Figure 2:
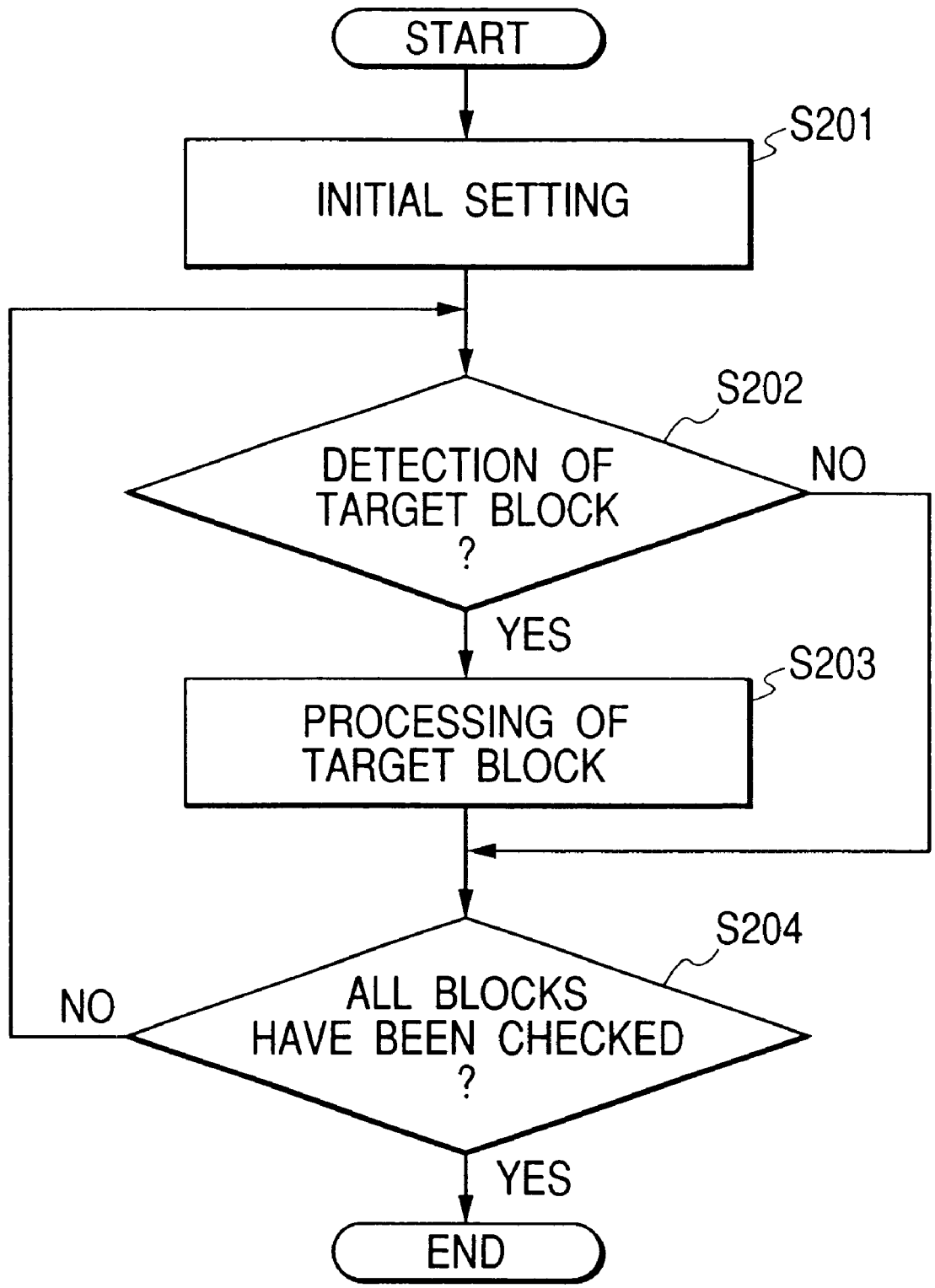
FIG. 2 is a flow chart illustrating the whole algorithm of a background interpolation process according to an embodiment of the invention.

FIG. 2 is a flow chart illustrating the overall algorithm for a series of processes to be executed for a frame whose background object is to be interpolated. This flow chart illustrates the algorithm for one target frame. If a plurality of frames are to be processed, the processes are repeated as many times as the number of frames.

At Step S201 initial settings are executed. The main initial settings include a target frame setting, a setting of the number of sample frames, a process of dividing a target frame into blocks, and the like.

In this example, the frame shown in FIG. 8A is the target frame, and the two (N−1)-th and (N−2)-th frames are the sample frames. The target frame shown in FIG. 8A divided into blocks is shown in FIG. 9.

Each block divided at Step S201 is checked at Step S202 whether it is a target block. This check can be made by checking whether the block contains data of the zero luminance level.

If the luminance level of an image is represented by 8-bit (0 to 255) data, the lowest level of an image signal, i.e., the black signal, is generally set to "16". Therefore, if the data having the zero level is searched, an erroneous discrimination between the zero level and the black level can be avoided. Data to be tempolarily inserted into the hole is arbitrary, and data to be inserted is not limited only to the data having the zero level, but other data having no possibility of erroneous discrimination may also be used.

Figure 9:
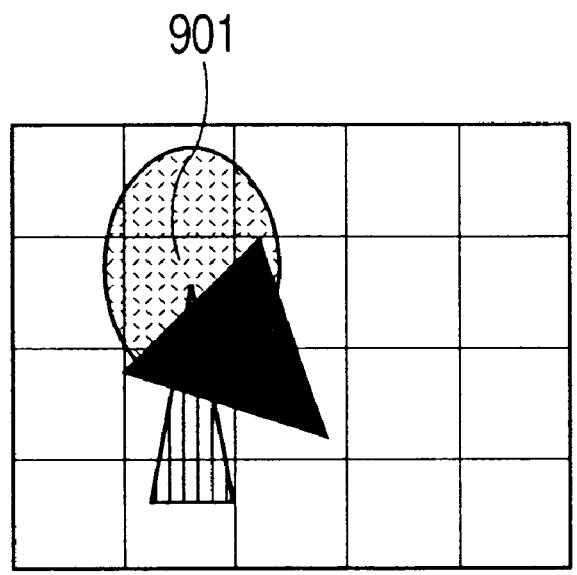
FIG. 9 shows an N-th frame divided into blocks.

With the above-described operation of detecting the target block, it is judged that the block 901 shown in FIG. 9 is the first target block.

The block judged as the target block is subjected to the interpolation process at Step S203 to thereafter process the next block. The details of the interpolation process will be later given.

Each block is processed in the above manner, and if it is judged at Step S204 that all the blocks were processed, the interpolation process for the whole target frame is completed.

Next, the algorithm for processing the target block according to the first embodiment will be described with reference to FIG. 3.

When the target block is detected, surrounding blocks are determined at Step S301.

Figure 10:
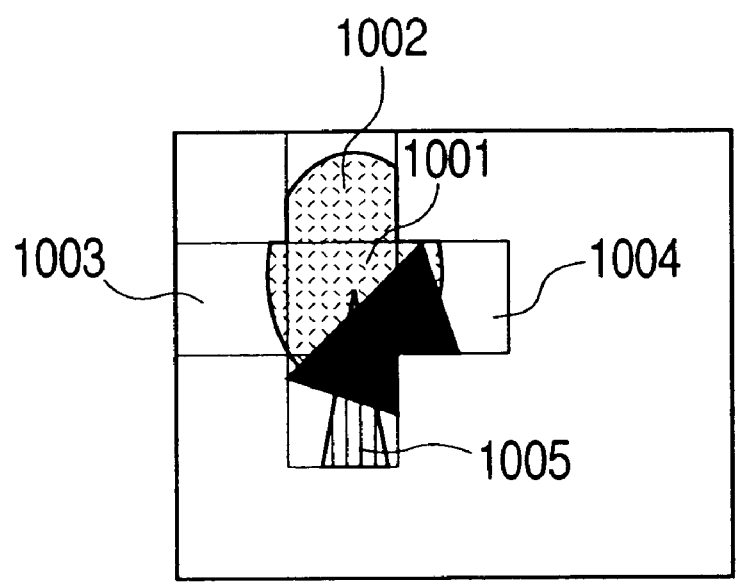
FIG. 10 shows a target block to be interpolated and its surrounding blocks.

FIG. 10 shows the target block and its surrounding blocks. A block 1101 is the target block to be interpolated, and blocks 1002 to 1005 are the surrounding blocks. In this example, the upper, lower, right and left blocks relative to the target block are used as the surrounding blocks.

Next, at Step S302 a motion vector candidate for the target block is calculated. The motion vector candidate for the target block is determined from motion vectors in the surrounding blocks. The details thereof will be described with reference to FIG. 4.

First, at Step S401 data in the surrounding blocks is checked to judge whether there is a data missing portion in each block. If there is a data missing portion, a desired result cannot be obtained at a later pattern matching process, so that a motion vector of this block is not calculated.

If there is no data missing portion, a pattern matching process is executed at Step S402 between the surrounding block and the sample frame. Each time the matching process is executed, a square sum of differences in blocks is calculated. After the matching process is completed, relative position information of the block having the minimum square sum of differences, i.e., a motion vector, is obtained at Step S403.

At Step S404 the reliability of the obtained motion vector is verified.

Namely, if the minimum square sum of differences is equal to or larger than a threshold value, it is judged that the motion vector with the minimum square sum of differences should not be adopted as a motion vector candidate. Only if the minimum square sum is smaller than the threshold value, this motion vector is used as the motion vector candidate for the target block at Step S405.

The above processes are repeated as many times as the number of surrounding blocks. When it is judged at Step S406 that all the surrounding blocks were processed, the process of calculating the motion vector candidate for the target block is terminated.

It is to be noted herein that the number of motion vector candidates may be the number of surrounding blocks at a maximum, and there may be no motion vector candidate at a minimum.

Figure 3:
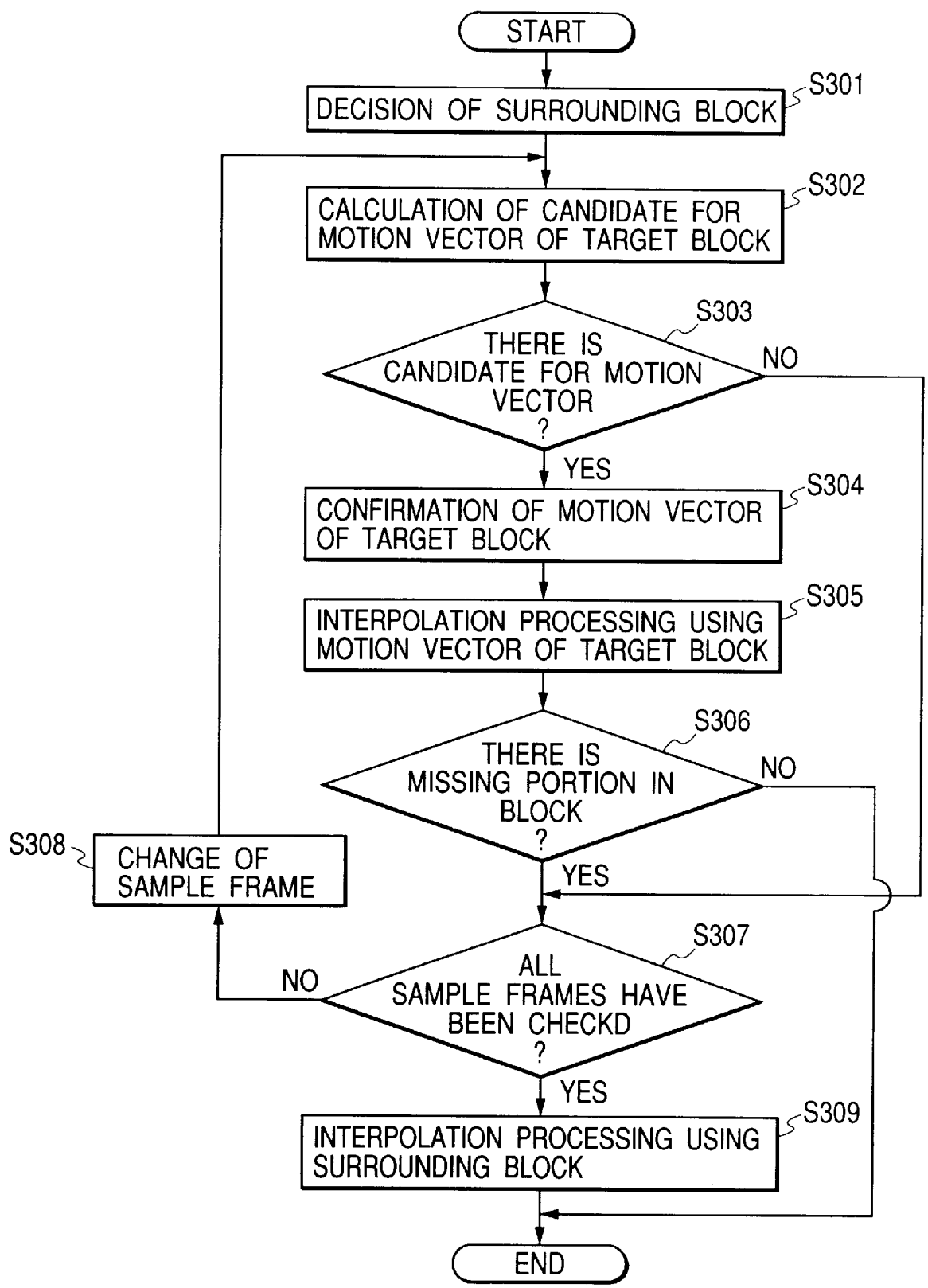
FIG. 3 is a flow chart illustrating an algorithm for processing a target block according to a first embodiment of the invention.
Figure 4:
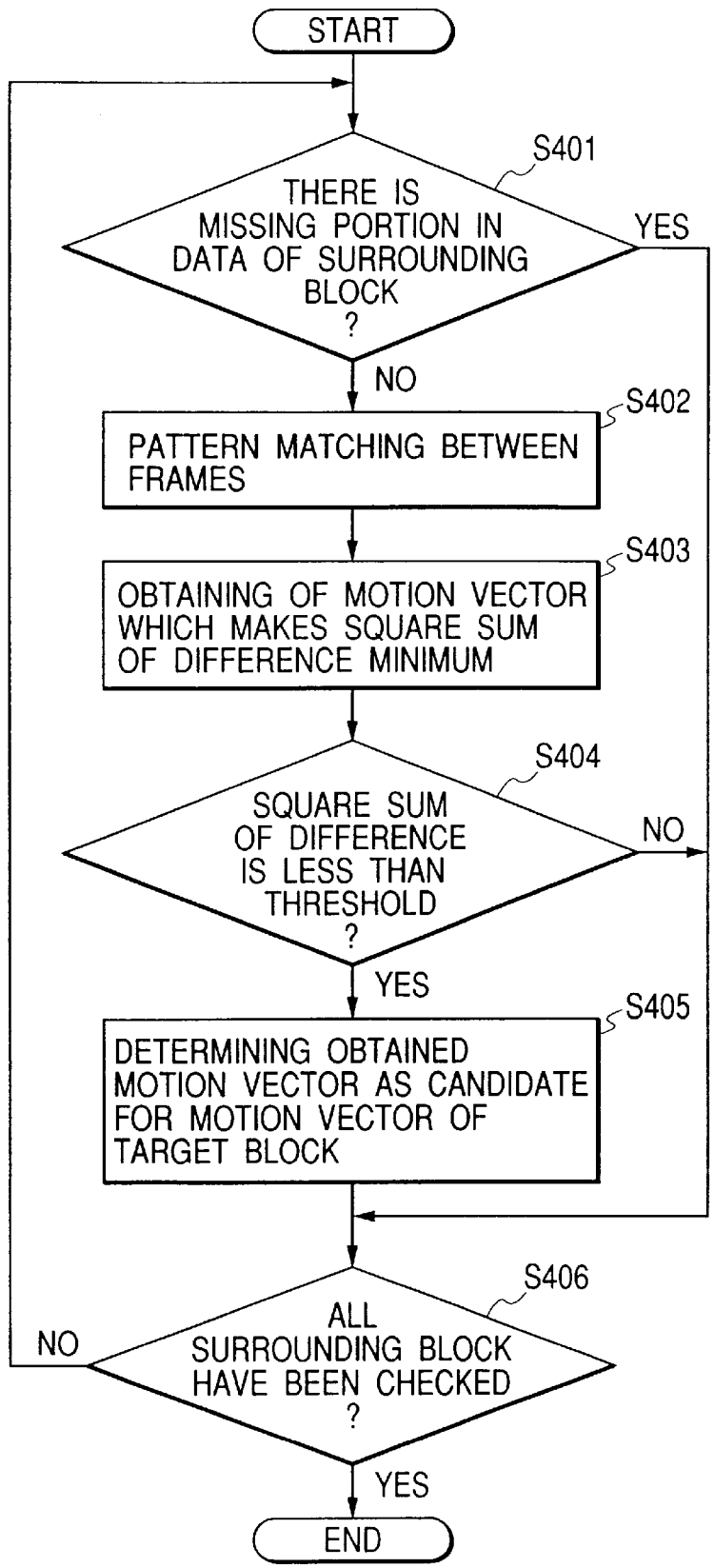
FIG. 4 is a flow chart illustrating an algorithm for calculating a motion vector candidate for a target block.

At Step S303 shown in FIG. 3, it is judged whether there is a motion vector candidate, and the flow branches in accordance with this judgement.

In the example shown in FIG. 10, the surrounding blocks 1002 and 1003 have no data missing portion so that the motion vector is calculated. Assuming that the background image does not move, there is an area whose square sum of differences is zero and this motion vector is (0, 0).

The surrounding blocks 1004 and 1005 shown in FIG. 10 have a data missing portion so that the motion vector calculation process is not executed. In the example shown in FIG. 10, there are two motion vector candidates after the completion of the algorithm shown in FIG. 4.

If there is a motion vector candidate for the target block, the flow advances to Step S304 shown in FIG. 3. At Step S304, the motion vector for the target block is determined from the motion vector candidates. The detailed algorithm will be described with reference to FIG. 5.

First, at Step S501 it is checked whether there are a plurality of motion vector candidates. If there is only one candidate, this candidate is determined at Step S502 as the motion vector for the target block.

If there are a plurality of motion vector candidates, it is checked at Step S503 whether there are vectors having the same value. If there is no vector having the same value, the motion vector candidate having the minimum square sum of differences is determined at Step S504 as the motion vector for the target block.

If there are vectors having the same value, it is checked at Step S505 whether there are a plurality of groups of motion vector candidates having the same value. If there is one group of motion vector candidates having the same value, this motion vector candidate is determined at Step S506 as the motion vector for the target block.

If there are two or more groups of motion vector candidates having the same value, it is checked at Step S507 whether there are a plurality of groups of maximum number of motion vector candidates having the same value. If there are not a plurality of groups of maximum number of motion vector candidates having the same value, this motion vector candidate is determined at Step S508 as the motion vector for the target block.

Consider the case wherein of four motion vectors, the two motion vectors have the same value and the remaining motion vectors also have the same value. In this case, there are a plurality of groups of maximum number of motion vector candidates having the same value. Therefore, it is checked at Step S509 whether there are a plurality of groups having the minimum square sum of differences among the groups of maximum number of motion vector candidates. If there is one group having the minimum square sum of differences, this motion vector candidate is determined at Step S510 as the motion vector for the target block. If there are a plurality of groups having the minimum square sum of differences, an average of a plurality of groups having the minimum square sum of differences is calculated, and this average is determined at Step S511 as the motion vector for the target block.

In the example shown in FIG. 10, there are two motion vector candidates having the same value. Therefore, this motion vector candidate is determined as the motion vector for the target block.

After the motion vector for the target block is determined, the flow advances to Step S305 shown in FIG. 3 whereat an interpolation process is executed by using the motion vector for the target block.

Figure 6:
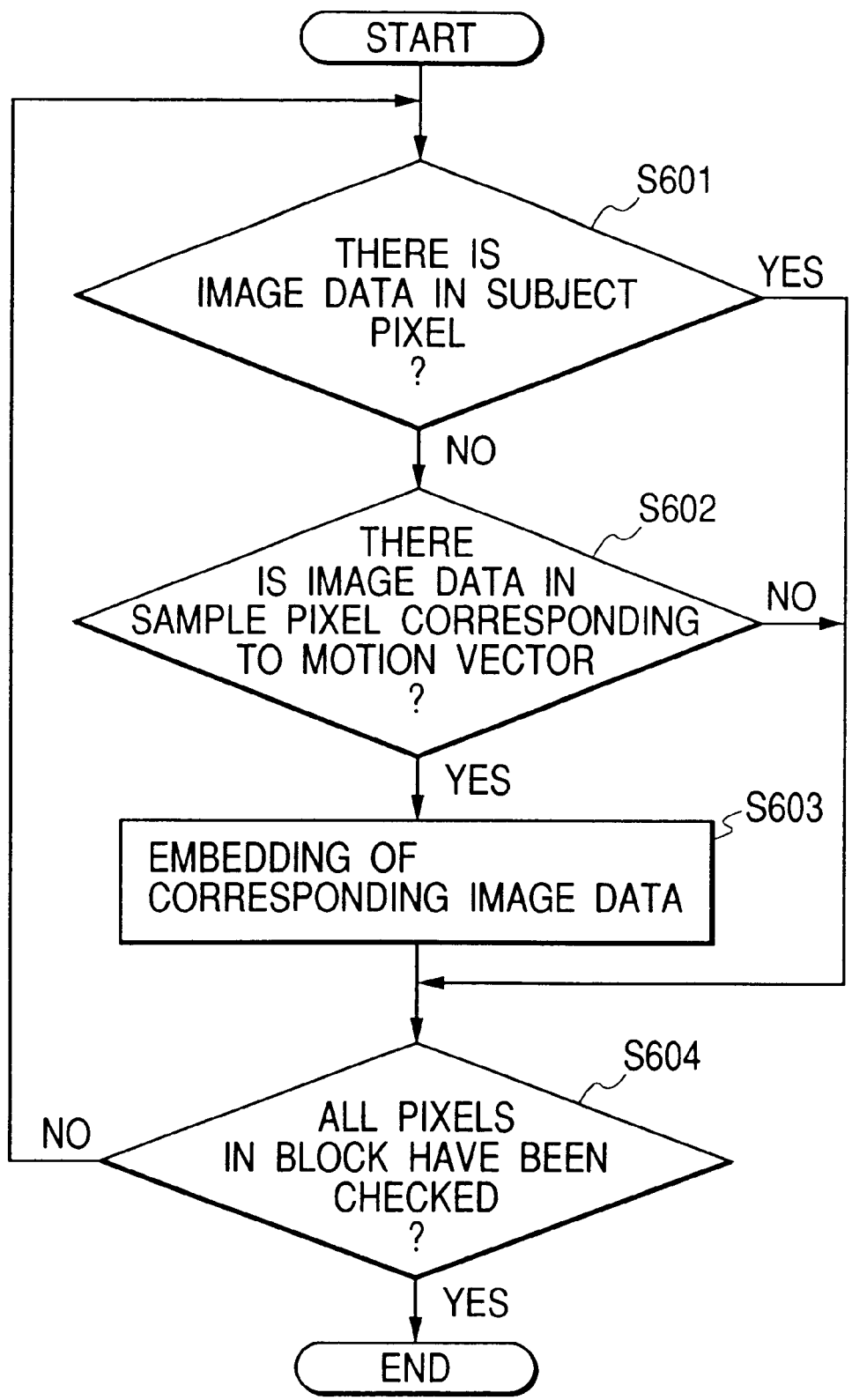
FIG. 6 is a flow chart illustrating an algorithm of an interpolating process by using a motion vector for a target block.

FIG. 6 is a flow chart illustrating the interpolation process using the motion vector for the target block. This process is executed for each pixel in the block.

First, at Step S601 it is checked whether data exists already at a position where image data is to be filled in. If exists, this data itself is used to process the next pixel, whereas if the data does not exist, the flow advances to Step S602 whereat it is checked whether there is image data at a sample pixel of the sample frame corresponding to the motion vector. If the image data exists, this data is embedded in the target pixel position at Step S603, whereas if the data does not exist, the next pixel is processed.

FIGS. 11A to 11G illustrate how one target block is interpolated.

Figure 11A:
FIGS. 11A, 11B, 11C, 11D, 11E, 11F and 11G are schematic diagrams showing images during an interpolation process.
Figure 11B:
Figure 11C:
Figure 11D:

FIG. 11A shows the target block. FIG. 11B shows a sample block determined from the first (N−1)-th sample frame. The basic interpolation process is to replace FIG. 11A by FIG. 11B. Already existing data in FIG. 11A is used as it is, and a data missing portion in FIG. 11A is filled with the data in FIG. 11B. However, since a data missing portion exists also in FIG. 11B, the area where data is actually filled is a hatched area shown in FIG. 11C. The block with the hatched area shown in FIG. 11C being filled with data is shown in FIG. 11D.

If it is judged at Step S604 that all the pixels in the block were processed, this routine is terminated.

With the above operations, it is not necessarily the case that the data can be filled in all necessary pixels in the block. At Step S306 shown in FIG. 3 it is checked whether there is still a data missing portion in the block. If data is filled in all necessary pixels, the block processing is completed. If there is still a data missing portion, at Step S308 the sample frame is changed to repeat the above-described processes starting from Step S302. If one of the following two conditions is satisfied, the flow advances to Step S308. One condition is that there is no motion vector candidate, and the other condition is that even if the motion vector is determined, data of the motion vector is insufficient for filling all necessary pixels.

At Step S307 shown in FIG. 3 the number of sample frames initially set at Step S201 shown in FIG. 2 is checked. If there is a data missing portion even if all the sample frames are used, then at Step S309 data is filled in by interpolation with surrounding pixels.

Since there is a data missing portion in FIG. 11D, the (N−1)-th sample frame is changed to the (N−2)-th sample frame to repeat the above processes.

Figure 11E:
Figure 11F:
Figure 11G:

FIG. 11E shows the sample block determined from the (N−2)-th sample frame. The hatched area shown in FIG. 11F corresponds to an area where data is embedded. The result of the data embedding is shown in FIG. 11G. Since there is no data missing portion in FIG. 11G, the process for this target block is terminated.

In the above manner described with reference to FIG. 3, a process for one target block is completed. This process is repeated for all target blocks in one target frame to complete the process for one target frame.

Figure 12A:
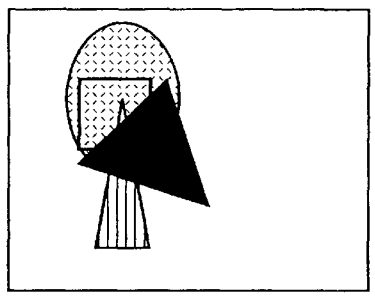
FIGS. 12A, 12B and 12C are schematic diagrams showing images during an interpolation process.
Figure 12B:
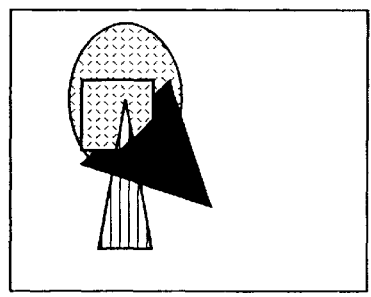
Figure 12C:
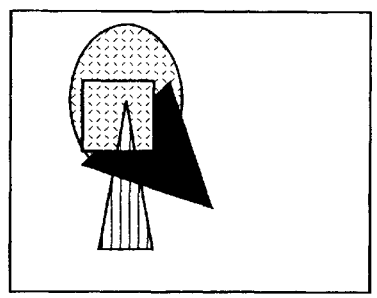

FIGS. 12A to 12C are diagrams briefly illustrating the above-described process.

FIG. 12A shows an image before the interpolation process, FIG. 12B shows an image after the interpolation process by using the (N−1)-th frame, and FIG. 12C shows an image after the interpolation process by using the (N−2)-th frame.

Figure 13A:
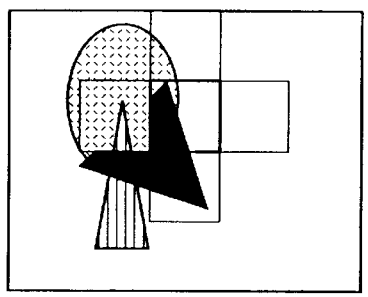
FIGS. 13A, 13B, 13C, 13D, 13E and 13F are schematic diagrams showing images during an interpolation process.
Figure 13B:
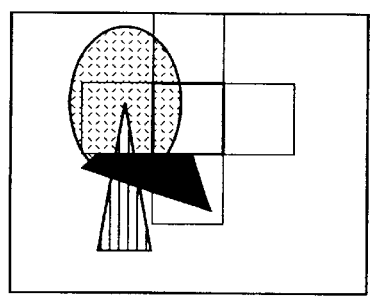
Figure 13C:
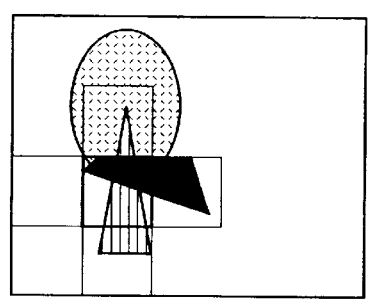
Figure 13D:
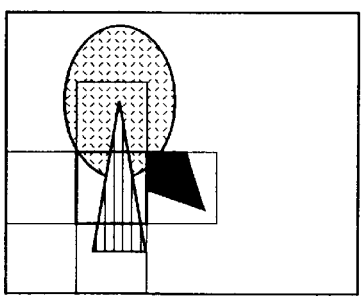
Figure 13E:
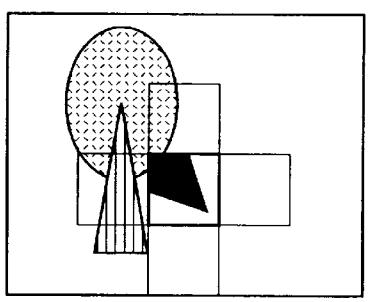
Figure 13F:
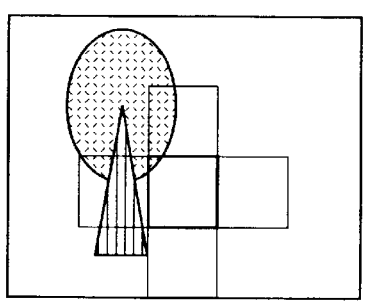
Figure 14A:
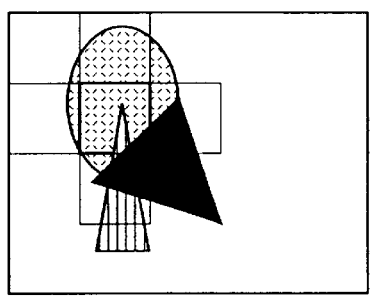
FIGS. 14A, 14B, 14C, 14D and 14E are schematic diagrams showing images during an interpolation process.
Figure 14B:
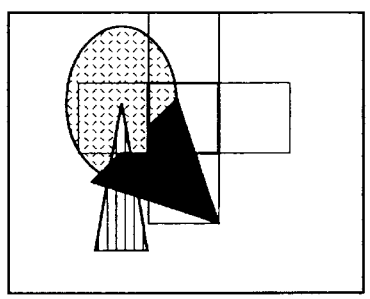
Figure 14C:
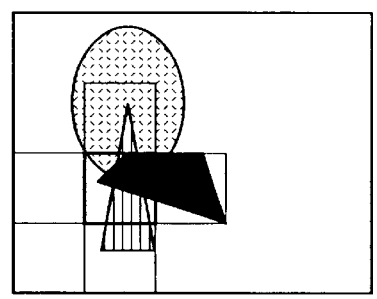
Figure 14D:
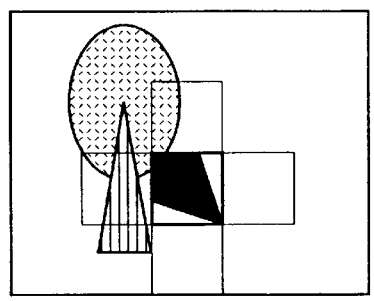
Figure 14E:
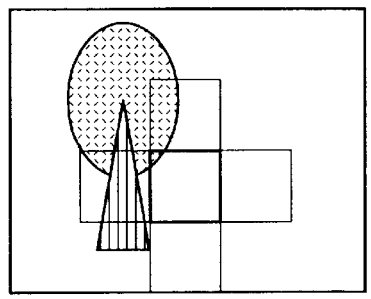

FIG. 13A shows the second target block and its surrounding blocks. The motion vector for the target block is determined from these surrounding blocks and the target block is interpolated. The result is shown in FIG. 12B. Similarly, FIG. 13C shows the third target block and its surrounding blocks, and the interpolation result is shown in FIG. 13D. FIG. 13E shows the fourth target block and its surrounding blocks, and the interpolation result is shown in FIG. 13F.

The process shown in FIG. 2 is repeated by changing the target frame and sample frame, so that the background images of a plurality of frames can be interpolated. FIGS. 14A to 14E are diagrams illustrating a similar interpolation process to be executed by changing the target frame to the (N−1)-th target frame.

Next, the second embodiment will be described.

In the first embodiment, if a surrounding block has no data missing portion, the motion vector is not calculated. In the second embodiment, a motion vector is calculated in accordance with effective data other than the data missing portion. The overall structure of the second embodiment is similar to that shown in FIGS. 1A and 1B, and the whole algorithm is similar to that shown in the flow chart of FIG. 2 of the first embodiment.

Figure 5:
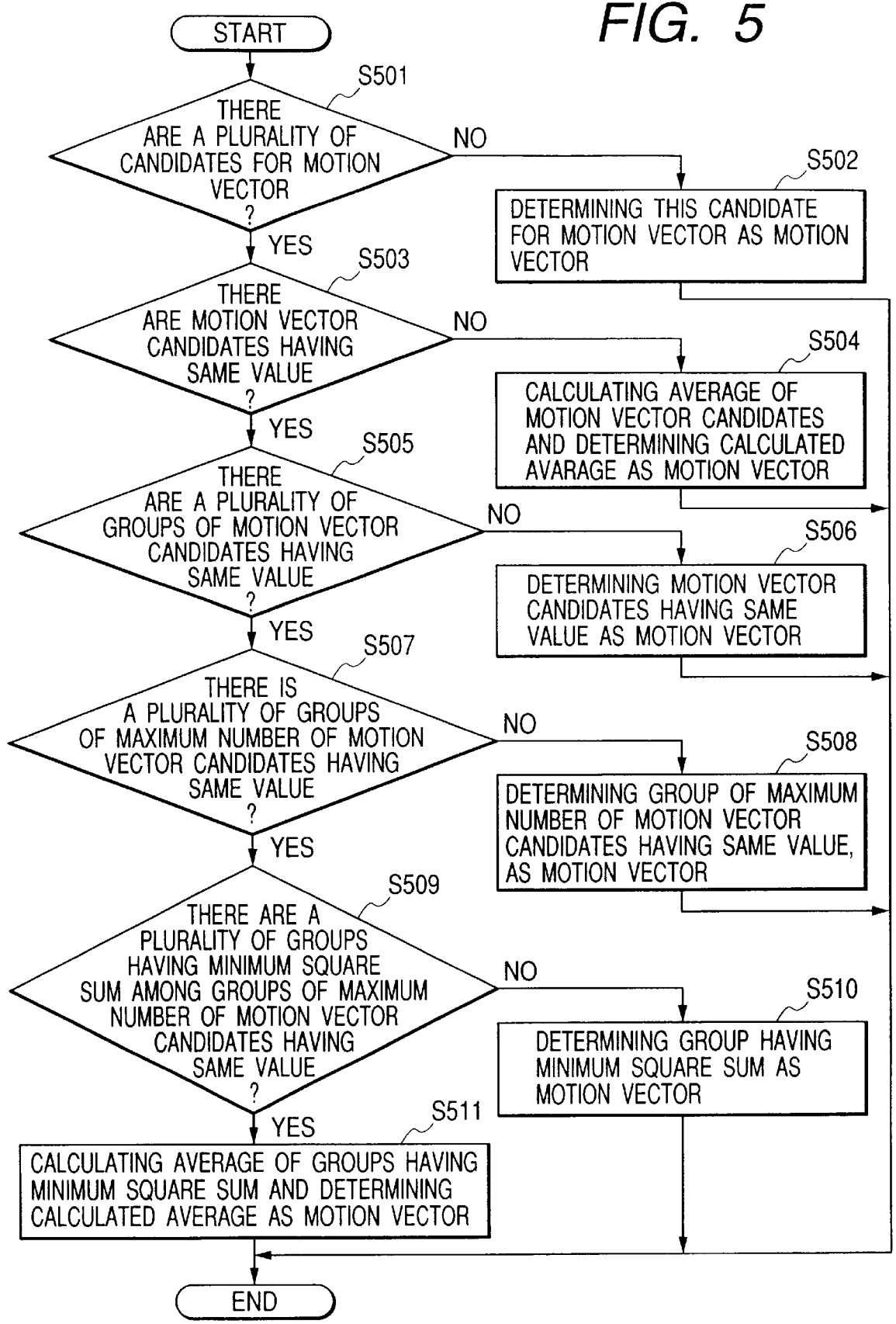
FIG. 5 is a flow chart illustrating an algorithm for determining a motion vector for a target block.
Figure 15:
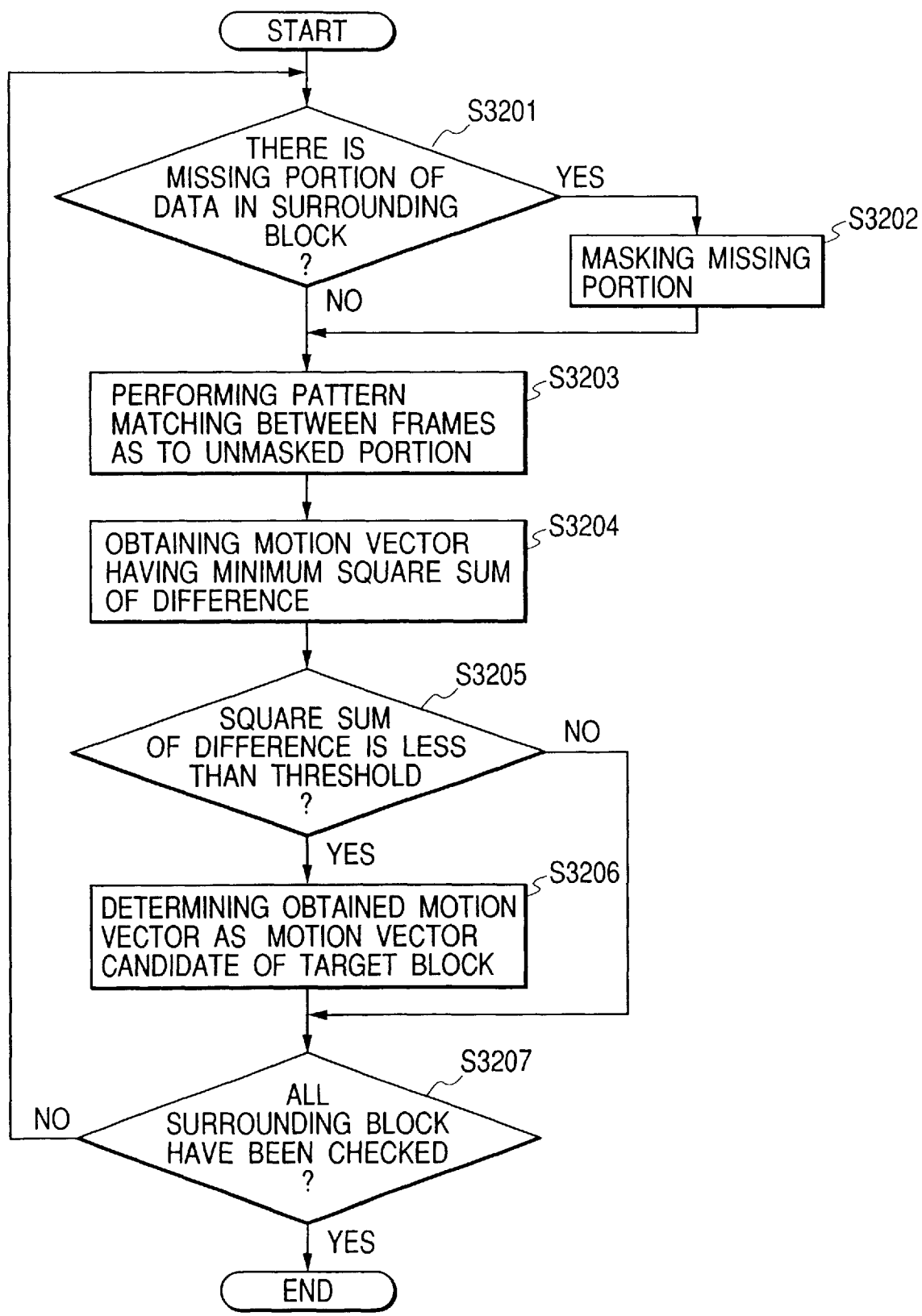
FIG. 15 is a flow chart illustrating an algorithm for calculating a motion vector candidate for a target block according to a second embodiment of the invention.

The flow chart shown in FIG. 15 corresponds to the algorithm for determining the motion vector for the target block illustrated in FIG. 5. If it is judged at Step S3201 that a surrounding block contains a data missing portion, then at Step S3202 masking data for the data missing portion is generated. The masking data is generated on the one-pixel unit basis and is used as a judging means for determining one motion vector from motion vector candidates.

Figure 17A:
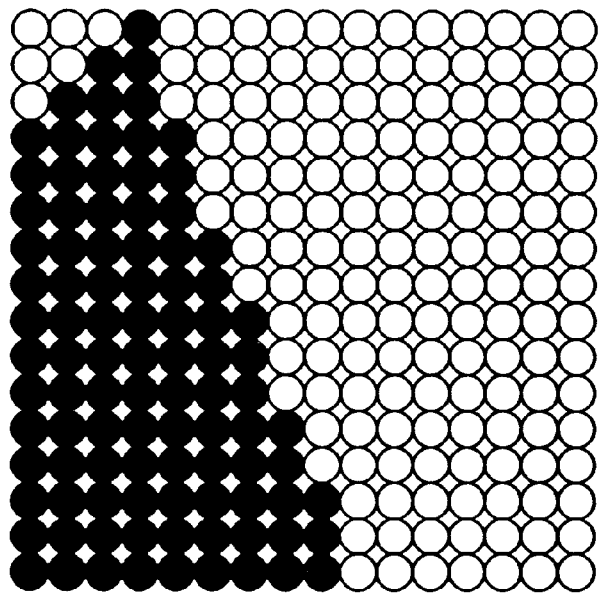
FIGS. 17A and 17B are diagrams illustrating a masking process for surrounding blocks.
Figure 17B:
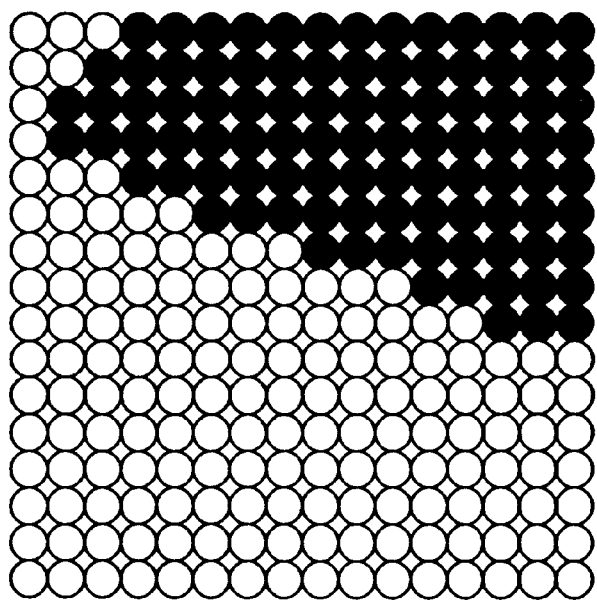

Assuming that the size of each block shown in FIG. 10 is 16×16, the masking data for the surrounding block 1004 becomes as shown in FIG. 17A. The masking data for the surrounding block 1005 becomes as shown in FIG. 17B. The solid black pixels are masked pixels, and the solid white pixels have effective data. The number of effective data sets is 97 for both the cases shown in FIGS. 17A and 17B. The surrounding blocks 1002 and 1003 shown in FIG. 10 have no data missing portion and have 256 effective data sets.

Next, at Step S3203 by using only the effective data not masked, a pattern matching is performed. If the block has no data missing portion, a pattern matching is performed by using all pixels as in the conventional technique. The process at Step S3204 is similar to the first embodiment (Step S403 shown in FIG. 4).

At Step S3205 a square sum of differences is compared with the threshold value. This threshold value is changed with the number of data sets used for the pattern matching. The threshold value THa of a block with all pixels being effective can be given by the following equation (1):

$$THa = (Ms/P) \times THa \qquad (1)$$

where P is the total number of pixels in the block, and Ms is the number of effective data sets in the block.

If the square sum of differences is smaller than this threshold value, this motion vector is determined at Step S3206 as the motion vector candidate for the target block. Similar processes are performed for all surrounding blocks to thereafter terminate this algorithm.

Next, an algorithm for determining the motion vector for the target block will be described with reference to FIG. 16. Three methods may be used for determining one motion vector from a plurality of motion vector candidates.

The first method is to select one motion vector from a plurality of candidates, the second method is to calculate one value by performing a calculation for the plurality of candidates, the third method is a combination of the first and second methods.

The process characteristic to the second embodiment of the invention is related to the second calculation method.

If there are a plurality of motion vector candidates which have not the same value, it is not preferable to select one motion vector from these candidates. Therefore, at Step S3304 an average is calculated after weighting each motion vector candidate. The motion vector (Vx, Vy) is given by:

$$Vx = \sum_{n=1}^{N} (Mn \times Vnx) \bigg/ \sum_{n=1}^{N} Mn \qquad (2)$$

$$Vy = \sum_{n=1}^{N} (Mn \times Vny) \bigg/ \sum_{n=1}^{N} Mn$$

where Vn (Vnx, Vny) represents each of N motion vector candidates and Mn represents the number of effective data sets in each surrounding block. If the surrounding block has no data missing portion, Mn is equal to the total number of pixels.

It is also not preferable to select one motion vector from a plurality of motion vector candidates at Step S3311. Therefore, the motion vector is calculated by using the equations (2). In this embodiment, the weighted average is calculated at Steps S3304 and S3311, and one motion vector is selected from a plurality of candidates at other Steps. Instead, one of the weighted average calculation and a simple selection may be used as desired in accordance with the condition setting.

The system having functional blocks shown in FIGS. 1A, 1B and 2 may be structured by using hardware or by using a microcomputer system with a CPU, a memory and the like. If the microcomputer system is used, the memory constitutes a storage medium which realize the invention. This storage medium stores therein programs for executing the control procedures of the above-described operations illustrated in the flow charts. The recording medium may be a semiconductor memory such as a ROM and a RAM, an optical disk, a magneto optical disk, or a magnetic medium. The contents of such a recording medium may be stored in a CD-ROM, a floppy disk, a magnetic tape, a non-volatile memory card or the like.

If this storage medium is supplied to another system or apparatus different from the system shown in FIGS. 1A, 1B and 2 and a computer of this system or apparatus reads program codes stored in the storage medium and executes them, the invention with similar advantages can be realized.

As described so far, according to the embodiments, a background image having a data missing portion can be interpolated. Therefore, a reusable background object having a high versatility can be formed easily and reliably.

In other words, the foregoing description of embodiments has been given for illustrative purposes only and not to be construed as imposing any limitation in every respect.

The scope of the invention is, therefore, to be determined solely by the following claims and not limited by the text of the specifications and alterations made within a scope equivalent to the scope of the claims fall within the true spirit and scope of the invention.

What is claimed is:

1. An image processing apparatus comprising:
 a) an input unit, arranged to input background object data, wherein the background object data is image data in a picture which remains after removing foreground object data from the picture, the removal producing a missing portion in the picture corresponding to the removed foreground object data; and
 b) an interpolating unit, arranged to generate background object data of the missing portion corresponding to the foreground object data using background object data of another picture, and to interpolate the missing portion of the input picture with the generated background object data.

2. An apparatus according to claim 1, wherein said interpolating unit comprises:
 a) a dividing unit, arranged to divide the background object data into a plurality of blocks;
 b) a deriving unit, arranged to derive as a target block a block containing the missing portion from the blocks divided by said dividing unit;
 c) a detecting unit, arranged to detect a motion of surrounding blocks near the target block by using image data of another picture, and generate a detection result as motion information; and
 d) a generating unit, arranged to generate image data of the missing portion of the target block in accordance with the motion information.

3. An apparatus according to claim 1, wherein said interpolating unit is arranged to interpolate the missing portion of the input picture repeatedly so that in a case where the interpolated picture still includes a missing portion, said interpolating unit changes the other picture to be used for the interpolation in order to interpolate the missing portion still included in the interpolated picture.

4. An apparatus according to claim 2, wherein the surrounding blocks are blocks which do not contain the missing portion.

5. An apparatus according to claim 2, wherein said detecting unit detects a motion of each surrounding block having the missing portion, by masking the missing portion and using data other than the missing portion.

6. An apparatus according to claim 2, wherein the motion information is a motion vector, and said detecting unit calculates a square sum of differences of respective pixels between each surrounding block and a block of the other picture.

7. An apparatus according to claim 6, wherein said detecting unit calculates the motion vector by using a square sum value in excess of a predetermined threshold value.

8. An apparatus according to claim 2, wherein said generating unit selects one of a plurality of motion information pieces detected from a plurality of surrounding blocks, and generates image data of the missing portion of the target block in accordance with the selected motion information.

9. An apparatus according to claim 2, wherein said generating unit selects one of a plurality of motion information pieces detected from a plurality of surrounding blocks, in accordance with decision by majority, and generates image data of the missing portion of the target block in accordance with the selected motion information.

10. An apparatus according to claim 6, wherein said generating unit weights a plurality of motion information pieces detected from a plurality of surrounding blocks, calculates one motion information piece from a plurality of weighted motion vectors, and generates image data of the missing portion of the target block in accordance with the calculated motion information piece.

11. An apparatus according to claim 10, wherein the weighting is performed in accordance with a relative distance between the target block and each surrounding block.

12. An apparatus according to claim 10, wherein the weighting is performed in accordance with a square sum of differences obtained when the motion vector is calculated.

13. An apparatus according to claim 1, further comprising a first encoding unit, arranged to encode the background object data processed by said interpolating unit.

14. An image processing apparatus comprising:
 a) an input unit, arranged to input image data of a picture;
 b) a separating unit, arranged to separate the image data input by said input unit into foreground object data and background object data;
 c) an interpolating unit, arranged to generate background object data of the missing portion corresponding to the separated foreground object data using background object data of another picture, and to interpolate the missing portion of the picture with the generated background object data;
 d) a first encoding unit, arranged to encode the picture interpolated by said interpolating unit; and
 e) a second encoding unit, arranged to encode the foreground object data.

15. An apparatus according to claim 14, further comprising a multiplexing unit, arranged to multiplex the background object data encoded by said first encoding unit and the foreground object data encoded by said second encoding unit.

16. An apparatus according to claim 14, wherein said interpolating unit comprises a dividing unit, arranged to divide the background object data into a plurality of blocks, a deriving unit, arranged to derive as a target block a block having the missing portion from the plurality of blocks, and derive surrounding blocks of the target blocks, and a motion vector detecting unit, arranged to detect a motion vector of each surrounding block, wherein data in the missing portion is interpolated in accordance with a detection result of said motion vector detecting unit.

17. An image processing method comprising the steps of:
   a) inputting background object data, wherein the background object data is image data in a picture which remains after removing foreground object data from the picture, the removal producing a missing portion in the picture corresponding to the removed foreground object data; and
   b) generating interpolated background object data of the missing portion corresponding to the foreground object data using background object data of another picture, and interpolating the missing portion of the input picture with the generated background object data.

18. An image processing method comprising the steps of:
   a) inputting image data of a picture;
   b) separating the input image data into foreground object data and background object data;
   c) generating interpolated background object data of the missing portion corresponding to the separated foreground object data using the background object data of another picture, and interpolating the missing portion of the picture with the generated background object data;
   d) encoding the interpolated picture using a first encoding unit; and
   e) encoding the foreground object data using a second encoding unit.

19. A method according to claim 17, wherein said interpolating step includes repeatedly interpolating the missing portion of the input picture so that in a case where the interpolated picture still includes a missing portion, that other picture to be used for the interpolation is changed to interpolate the missing portion still included in the interpolated picture.

20. An apparatus according to claim 13, further comprising a second encoding unit, arranged to encode the foreground object data separated by said separating unit.

21. An apparatus according to claim 20, further comprising a multiplexing unit, arranged to multiplex the background object data encoded by said first encoding unit and the foreground object data encoded by said second encoding unit.

* * * * *

UNITED STATES PATENT AND TRADEMARK OFFICE
CERTIFICATE OF CORRECTION

PATENT NO. : 6,721,360 B2
DATED : April 13, 2004
INVENTOR(S) : Osamu Itokawa

It is certified that error appears in the above-identified patent and that said Letters Patent is hereby corrected as shown below:

<u>Title page,</u>
Item [22], Filed, "September 28, 1999" should read -- October 7, 1999 --.

Signed and Sealed this

Second Day of May, 2006

JON W. DUDAS
*Director of the United States Patent and Trademark Office*